Patented Apr. 28, 1942

2,280,852

UNITED STATES PATENT OFFICE 2,280,852

COATED ABRASIVE ARTICLE

Norman P. Robie, Niagara Falls, N. Y., assignor to The Carborundum Company, Niagara Falls, N. Y., a corporation of Delaware No Drawing. Application February 24, 1938, Serial No. 192,391

7 Claims. (Cl. 51—303)

My invention relates to improvements in the production of abrasive articles, the use of novel adhesives in such production, and the improved articles thus produced.

I have discovered that cellulose derivatives such as cellulose ethers and esters which are soluble or dispersible in water or in aqueous solutions of alkalies are particularly well adapted to use as adhesives in the production of my improved abrasive articles.

According to various embodiments of my invention I may use solutions of these water or alkali soluble cellulose derivatives in presizing the usual paper and cloth backings used in the manufacture of flexible coated abrasive articles, or I may use such solutions for the usual making and/or sizing coats of adhesive employed in the manufacture of various coated abrasive articles.

The following examples represent specific embodiments illustrating how the objects of my invention may be accomplished.

Example I

An aqueous solution of medium viscosity methyl cellulose is prepared by adding 5 parts of methyl cellulose to 95 parts of boiling water and stirring until the methyl cellulose is dissolved or dispersed. The solution is then allowed to cool.

This adhesive solution is evenly coated on a paper backing in an amount equivalent to 7 pounds of adhesive per ream (9" x 11"—480 sheets) of paper. Fused alumina abrasive grain is uniformly applied to the adhesive coated backing in an amount equivalent to 22 pounds of grain per ream. The abrasive coated paper is air dried sufficiently for the making coat to set slightly and is then sized with more of the prepared solution of methyl cellulose in an amount equivalent to 13 pounds of adhesive per ream. After another period of drying, a second sizing coat of 5 pounds of adhesive per ream is applied. The abrasive paper thus obtained is of good quality even though the amount of dry adhesive used is quite small.

In this, as in the other specific examples herein, it is to be understood that the proportions and amounts given are only illustrative and not limiting. More concentrated solutions of the cellulose derivatives may be used if desired, suitable viscosity reducing materials being added if required. Thus, caustic soda and the zinc chloride double salt of phenyl hydrazine may be used to reduce the viscosity of aqueous methyl cellulose solutions. The amounts of abrasive may be varied and other abrasives such as silicon carbide and garnet may be used where desired.

The adhesive solutions may be applied to the backing or the abrasive coated backing in various ways. The conventional method described on pages 75 to 77 of Artificial abrasives and manufactured abrasive products, by V. L. Eardley-Wilmot, Canadian Dept. of Mines, Ottawa, 1929, or other methods known in the art such as spraying and painting may be employed.

Example II

A solution of ethyl cellulose is prepared by adding 8 parts of ethyl cellulose to 85 parts of water containing 7 parts of caustic soda dissolved therein. This mixture is agitated as by stirring or kneading and cooled to a temperature below 0° C. and preferably 5° to 15° below 0° C. to bring about solution of the ethyl cellulose, following which the temperature of the solution obtained is allowed to rise to room temperature.

This adhesive solution is evenly coated on a strong paper backing in an amount equivalent to 10 pounds of adhesive per ream of paper. Fused alumina abrasive grain of 80 grit size is uniformly applied to the adhesive coated backing and the abrasive coated paper is dried, preferably with warm air, sufficiently for the adhesive to set slightly. After drying, the paper is sized with more of the alkaline ethyl cellulose solution in an amount equivalent to 12 pounds of adhesive per ream.

The abrasive paper thus obtained is of good quality in spite of the relatively small amount of dry adhesive used.

Example III

An aqueous solution of cellulose aceto-lactate is prepared by adding, to 75 parts of water, 25 parts of the mixed cellulose ester prepared by replacing a portion of the acetic acid of a medium-viscosity cellulose acetate with lactic acid in a manner known in the art.

This adhesive solution is evenly coated on a strong paper backing in an amount equivalent to 6 pounds of solution per ream. Fused alumina abrasive grain or other grain is uniformly applied to the adhesive coated backing in an amount equivalent to 20 pounds per ream.

The backing carrying the adhesive and grain is then dried and thereafter is sized with more of the cellulose aceto-lactate solution in an amount equivalent to 12 pounds of adhesive per ream. The sized abrasive paper is then dried at 150° to produce an excellent abrasive paper.

As disclosed in the preceding examples, solutions of water or alkali-soluble cellulose derivatives may be used alone as adhesives in the production of flexible coated abrasive articles. Especially good results, however, may be obtained by the use of compound adhesives containing one or more of such cellulose derivatives and other suitable water or alkali-soluble materials.

Suitable materials of this type are glue, sodium silicate, liquid phenolic resin compositions, alkaline solutions of resins, dextrin, starch, casein, water-soluble gums, polyvinyl alcohol and the like. The proportions of the ingredients of the compound adhesive will, as may be readily seen, determine the properties of the adhesive and the products in the manufacture of which it is utilized. The following examples are representative of the use of compound adhesives containing water or alkali-soluble cellulose derivatives.

Example IV

A compound adhesive is prepared by mixing together 1000 parts of the 25% cellulose aceto-lactate solution used in Example III with 1000 parts of a 40% solution of hide glue.

This adhesive solution is applied in a uniform coating on a presized drill cloth in an amount equivalent to 6 pounds of adhesive per ream. Emery, ground to a grit size of 80, is then applied to the adhesive coated cloth backing after which the abrasive cloth is sized with another application of the same adhesive in an amount equivalent to 9 pounds of adhesive per ream of cloth. The emery cloth thus produced is of superior quality and is ideally adapted for polishing metals.

Example V

A compound adhesive is prepared by adding to 2000 parts of an 8% aqueous solution of low-viscosity methyl cellulose 3000 parts of a water-soluble liquid phenol-formaldehyde resin. Upon mixing, the methyl cellulose precipitates in a somewhat coarse dispersion in the water-resin phase. The mixture is allowed to stand for a period of from 12 to 24 hours during which standing the precipitate of methyl cellulose redissolves to give a brown, creamy compound adhesive.

This adhesive solution is applied uniformly to a paper backing in an amount equivalent to 5 pounds of adhesive per ream. Fused alumina abrasive of 80 grit size is then applied to the adhesive coated backing by any suitable process such as electrocoating, i. e., a process involving electrostatic application of the abrasive grain. Following the application of the abrasive, a sizing coat of the same adhesive is applied in an amount equivalent to 10 pounds of adhesive per ream.

This compound adhesive may be cured by heating for 4 hours at 125° F. followed by 18 hours at 175° F. and 4 hours at 250° F.

The compound adhesive used in this example exhibits unusual advantages in that the relatively high viscosity of the methyl cellulose solution enables the liquid resin to be diluted without objectionable thinning and reduction in viscosity. As will be obvious to those skilled in the art it is desirable to use a somewhat dilute sizing adhesive to obviate filling of the pores between the grains of abrasive with too much solid adhesive. The conditions of curing mentioned above are not in any way critical but are merely examples of operative times and temperatures. As is well known, these conditions may be varied over wide ranges.

The cited examples specifically disclose ways in which three water or alkali-soluble cellulose derivatives—methyl cellulose, ethyl cellulose, and cellulose aceto-lactate—may be employed as adhesives in the manufacture of abrasive paper and cloth. I do not, however, desire to be limited to those materials since other water or alkali-soluble cellulose derivatives may be advantageously employed.

In general the cellulose derivatives which I may use are those derivatives having attached to a cellulose residue, radicals containing sufficient hydroxy or carboxy groups to produce solubility in non-acid aqueous media.

Among the cellulose derivatives which I consider within the scope of my invention are many double esters of cellulose including an aliphatic or aromatic acyl radical and a radical of another acid of the group including the monobasic and di-basic aliphatic alpha-hydroxy-acids. These double esters can be prepared in known manner by the substitution of the radicals of the acids mentioned for one or more of the acyl radicals in a cellulose ester containing varying proportions of the acyl radical.

Representative of such double or mixed esters are cellulose aceto-tartrate, cellulose aceto-glycollate, cellulose aceto-glycerate, cellulose aceto-racemate, cellulose aceto-l-malate and cellulose aceto-d-l-malate.

Other cellulose derivatives suitable for use in the practice of my invention are cellulose xantho-fatty acids such as cellulose xanthacetic acid and cellulose-xanthobutyric acid, formed by substituting for a hydrogen atom united to a carbon atom, in a lower fatty acid, the residue of a cellulose xanthic acid, in which cellulose-xanthic acid the cellulose component may be cellulose itself, a conversion product thereof, or a cellulose compound. By the expression "organic acids comprising a cellulose residue" as used in the appended claims, I mean organic acids of the type described immediately above. Also suitable for use as adhesives in the practice of my invention are cellulose esters containing dicarboxylic acid groups such as cellulose hydrogen phthalate; alkyl cellulose hydrogen phthalates including methyl and ethyl cellulose hydrogen phthalates; cellulose diacetate hydrogen phthalate; cellulose benzoate hydrogen phthalate; cellulose hydrogen succinate; ethyl cellulose hydrogen quinolate; cellulose hydrogen maleate, cellulose hydrogen adipate; cellulose acetate diglycollate; cellulose acetate propionate diglycollate; cellulose acetate thio-diglycollate; and ethyl cellulose diglycollate.

Other cellulose derivatives which I may use are oxyalkyl or hydroxy-alkyl derivatives such as glycol cellulose, cellulose glycollic acid, 1:2 di-hydroxy-propyl cellulose, and hydroxy ethyl cellulose; esters such as cellulose aceto-oxalate.

The use of water or alkali-soluble adhesives in the production of flexible abrasive articles is of considerable benefit. The organic solvents now used with various adhesives suffer from several disadvantages. They are very inflammable and hence dangerous to work with, particularly in electrocoating; they are expensive and the apparatus for their recovery is troublesome and also expensive; and they are in many cases toxic, thus rendering their use difficult in the lack of expensive ventilation systems or in some cases the use of respirators or masks by the machine employees.

In contrast to these disadvantages of the organic solvents necessary with many adhesives, water, the liquid solvent used with my cellulose derivative adhesives, is non-inflammable, thus enabling the safe use of electrocoating as described in Example V and is also inexpensive and non-toxic. Moreover, water can be used in cleaning the coating machinery, mixers and containers.

My water or alkali-soluble adhesives are also well-adapted to the manufacture of so-called "backless sandpaper." As an example, a solution of methyl cellulose like that used in Example I is used, the adhesive and abrasive grain being applied as in that example, to a plate or sheet of smooth, polished metal. After the coating is dry it is stripped from the metal and treated with a hot, aqueous solution of tannic acid which insolubilizes and hardens the methyl cellulose to give an efficient product. Obviously, other cellulose derivative adhesives and other supporting materials such as smooth, hot calendered waxed or varnished paper, treated cellulose webs and the like may be substituted for the examples given.

The improved adhesives herein disclosed are useful in the production of all types of coated abrasives such as belts, discs, abrasive paper, abrasive cloth and the like.

The water or alkali-soluble cellulose derivatives may, as previously disclosed, be used in combination with other adhesives. Furthermore, modifying agents may be added to impart desirable properties.

Thus, softeners and/or plasticizers as, for example, glycerine; glycol and its derivatives, such as glycol mono ethyl ether, diethylene glycol mono butyl ether and the like; sugars, such as glucose or sorbitol; oils, such as castor oil; sulfonated oils, such as Turkey red oil; and waxes may be employed in suitable amounts in my adhesive compositions where their use is necessary or desirable.

The term "soluble" where used in the specification and claims as in "water-soluble" and "alkali-soluble" is intended to cover not only a condition of molecular solubility but also colloidal solubility or dispersibility such as that exhibited by proteids, starch, certain water-soluble gums and the like. In like manner, "solution," as used herein, is intended to include "dispersion."

The term "non-acid," as used in the specification and claims, is intended to include "neutral" and "alkaline."

The term "organic cellulose derivative," as used in the appended claims, is intended to include only those derivatives in which the cellulose has been only slightly modified or degraded and is not intended to include such distinct products as glucose and the like.

Though I have fully described my invention and given specific examples of methods by which it may be practiced, I do not wish to be limited to these examples but only by the following claims.

I claim:

1. As a novel article of manufacture, a coated abrasive article characterized by the abrasive grain being secured to the backing by an adhesive comprising a stable cellulose ester of a carboxylic acid soluble in a non-acid aqueous medium.

2. As a novel article of manufacture, a coated abrasive article characterized by the abrasive grain being secured to the backing by an adhesive comprising a cellulose ether soluble in a non-acid aqueous medium.

3. As a novel article of manufacture, a coated abrasive article characterized by the abrasive grain being secured to the backing by an adhesive comprising a stable organic acid comprising a cellulose residue which acid is soluble in a non-acid aqueous medium.

4. An improved coated abrasive article having a backing, a layer of abrasive grain and an adhesive comprising a cellulose ether soluble in a non-acid aqueous medium and a water-soluble liquid phenolic resin adhesively securing said abrasive grain to said backing.

5. An improved coated abrasive article having a backing, a layer of abrasive grain and an adhesive comprising a stable organic cellulose derivative soluble in a non-acid aqueous medium, which derivative is selected from the group consisting of cellulose esters of carboxylic acids, cellulose ethers and organic acids comprising a cellulose residue, securing said abrasive grain to said backing.

6. An improved coated abrasive article having a backing, a layer of abrasive grain and an adhesive comprising a stable organic cellulose derivative soluble in water, which derivative is selected from the group consisting of cellulose esters of carboxylic acids, cellulose ethers and organic acids comprising a cellulose residue, securing said abrasive grain to said backing.

7. An improved coated abrasive article having a backing, a layer of abrasive grain and an adhesive comprising a stable organic cellulose derivative soluble in an aqueous solution of alkali, which derivative is selected from the group consisting of cellulose esters of carboxylic acids, cellulose ethers and organic acids comprising a cellulose residue, securing said abrasive grain to said backing.

NORMAN P. ROBIE.